United States Patent Office 3,029,128
Patented Apr. 10, 1962

3,029,128
PREPARATION OF SODIUM OR POTASSIUM BOROHYDRIDE
David L. Chamberlain, Jr., Menlo Park, Calif., assignor to Callery Chemical Company, Pittsburgh, Pa., a corporation of Pennsylvania
No Drawing. Filed Oct. 19, 1955, Ser. No. 541,512
5 Claims. (Cl. 23—14)

This invention relates to the preparation of sodium and potassium borohydrides and more particularly it relates to a new and improved method of preparing these compounds by the reaction of sodium or potassium hydride and diborane in an inert solvent.

Several methods for preparing sodium or potassium borohydride have been patented or reported in the literature. These methods include the following: (1) the reaction of sodium or potassium hydride with trimethyl borate at elevated temperatures, (2) the reaction of sodium hydride with boric oxide, (3) the reaction of diborane with a sodium alkoxide, (4) the reaction of sodium with hydrogen and a fluoborate, boron halide or trimethyl borate, (5) the reaction of diborane with sodium or potassium trimethoxyborohydride. Although these methods are generally operative, they are not entirely satisfactory for large scale production or from the standpoint of yields obtained. Furthermore, Schlesinger and Brown in J.A.C.S. 75 187 (1953), state that sodium hydride and diborane do not react in diethyl ether solution. It has since been found that this reaction will proceed in other solvents as disclosed hereinafter.

It is an object of this invention to provide a new and improved method for preparing sodium or potassium borohydride.

Another object is to provide a simple and economical method for preparing sodium or potassium borohydride by the reaction of sodium or potassium hydride and diborane in a polyethylene glycol dimethyl ether.

Other objects will become apparent from time to time throughout the following specification and appended claims.

This invention is based upon the discovery that sodium or potassium hydride and diborane will react in the presence of an inert solvent for the borohydride, such as polyethylene glycol dimethyl ether, at atmospheric pressure and room temperature to produce a substantial yield of the borohydride.

In one experiment, sodium borohydride was prepared as follows: in a three-neck, 500 ml. round-bottomed flask equipped with a stirrer, nitrogen inlet and diborane inlet was placed 20 g. of freshly prepared sodium hydride and 250 ml. of anhydrous ethylene dimethyl ether, $CH_3OC_2H_4OCH_3$. The flask was connected to a Dry Ice condenser which was vented through a mercury bubbler. After the system was swept with nitrogen, .18 mol of diborane was passed through the slurry at a rate of 45 ml. per minute at atmospheric pressure and room temperature. The solvent was removed by distillation leaving a fine, white, crystalline residue. This residue was analyzed and found to contain 94% sodium borohydride based on the hydrogen evolved upon hydrolysis.

In another experiment, 0.2 mol of sodium hydride (5.38 g. of 90% purity) and 100 ml. of purified diethylene glycol dimethyl ether, $CH_3O(C_2H_4O)_2CH_3$, were placed in a 500 ml. shaker bottle. The bottle was evacuated and connected to a 4 l. supply bottle containing diborane at a pressure of 9 p.s.i.g. The mixture was shaken for one hour after which time the pressure had dropped to atmospheric. This pressure drop represented a consumption of 0.1 mol of diborane. The contents of the flask were filtered in a dry atmosphere, the solvent evaporated from the filtrate and the white crystalline residue was dried, weighed and analyzed. The yield was 4.87 g. of 95% pure sodium borohydride which was a yield of 97.5% based on the sodium hydride used.

In a third experiment, 5.45 g. of 90% pure sodium hydride in 100 ml. of purified ethylene glycol dimethyl ether was shaken as described above with 0.1 mol of diborane. A yield of 3.62 g. of 95.5% pure $NaBH_4$ was obtained which was 84.4% of theoretical based on the sodium hydride used.

Other inert solvents for sodium borohydride may be used as the reaction media for this process which are not reactive with diborane. Such solvents include polyethylene glycol dimethyl ethers having the general formula, $CH_3(OC_2H_4)_nOCH_3$ where $n$ is an integer from 1 to 4.

A slurry of potassium hydride will react with diborane in diethylene glycol dimethyl ether to produce a solution of potassium borohydride. As in the case of the sodium compound, the potassium hydride will go into solution immediately after contact with the diborane to produce a solution of potassium borohydride.

Having thus described this invention fully and completely as required by the patent laws, it will be apparent to those skilled in the art that other variations are possible. It should, therefore, be understood that within the scope of the appended claims this invention may be practiced otherwise than as specifically described.

What I desire to particularly point out and distinctly claim as my invention is:

1. A method of preparing a compound of the group consisting of sodium borohydride and potassium borohydride which comprises reacting a compound of the group consisting of sodium hydride and potassium hydride and diborane in a polyether having the general formula $CH_3(OC_2H_4)_nOCH_3$, where $n$ is an integer from 1 to 4; and recovering the borohydride from the solution thus formed.

2. A method according to claim 1 in which the solvent is ethylene glycol dimethyl ether and the hydride used is sodium hydride.

3. A method according to claim 1 in which the solvent is diethylene glycol dimethyl ether and the hydride used is sodium hydride.

4. A method according to claim 1 in which the reaction is carried out at atmospheric pressure and room temperature.

5. A method according to claim 1 in which the molar ratio of hydride to diborane used is about 2:1.

References Cited in the file of this patent

UNITED STATES PATENTS 2,545,633    Schlesinger et al. _____ Mar. 20, 1951

OTHER REFERENCES

Schechter et al.: "Boron Hydrides and Related Compounds," prepared under Contract NOa(s) 10992 for Dept. of Navy, Bureau of Aeronautics, prepared by Callery Chemical Co., printed March 1951, decl. December 1953, p. 52, 10, 46, 51.

Brown et al.: "Journal of the American Chemical Society," vol. 77, page 3164, June 5, 1955.

Schlesinger et al.: "Journal of the American Chemical Society, vol. 75, pages 199–204 (1953); page 187.

Bulletin 502A, "Sodium Borohydride," publ. by Metal Hydride, Inc.